(12) United States Patent
Mendez Lojo

(10) Patent No.: US 9,378,535 B2
(45) Date of Patent: Jun. 28, 2016

(54) EFFICIENT DUPLICATE ELIMINATION

(71) Applicant: Advanced Micro Devices, Inc., Sunnyvale, CA (US)

(72) Inventor: Mario Mendez Lojo, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 288 days.

(21) Appl. No.: 14/013,265

(22) Filed: Aug. 29, 2013

(65) Prior Publication Data

US 2015/0066872 A1  Mar. 5, 2015

(51) Int. Cl.
*G06F 17/30* (2006.01)
*G06T 1/20* (2006.01)

(52) U.S. Cl.
CPC .......... *G06T 1/20* (2013.01); *G06F 17/30097* (2013.01); *G06F 17/30156* (2013.01)

(58) Field of Classification Search
CPC .......... G06F 11/1453; G06F 17/30097; G06F 11/30156
USPC ................................. 707/692, 698
See application file for complete search history.

(56) References Cited

U.S. PATENT DOCUMENTS

| | | | |
|---|---|---|---|
| 6,381,601 B1 * | 4/2002 | Fujiwara ........... | G06F 17/30489 707/692 |
| 8,185,459 B2 * | 5/2012 | Wall .................. | G06K 9/00986 235/375 |
| 8,321,385 B2 * | 11/2012 | Burroughs ............ | G06F 9/3851 707/692 |
| 8,543,543 B2 * | 9/2013 | Marcelais ......... | G06F 17/30097 707/609 |
| 2004/0199490 A1 * | 10/2004 | Peled ........................ | G06F 7/02 |
| 2010/0220853 A1 * | 9/2010 | Schneider ............. | H04L 9/0643 380/29 |
| 2010/0299333 A1 * | 11/2010 | Osmond ........... | G06F 17/30949 707/747 |
| 2010/0332506 A1 * | 12/2010 | Deen ................. | G06F 17/30861 707/759 |
| 2011/0099175 A1 * | 4/2011 | Darcy ............... | G06F 17/30949 707/747 |
| 2011/0113029 A1 * | 5/2011 | Kaal ..................... | H04L 67/104 707/723 |
| 2011/0191305 A1 * | 8/2011 | Nakamura ............ | G06F 3/0608 707/692 |
| 2011/0314291 A1 * | 12/2011 | Takenaka .............. | H04L 9/3236 713/176 |
| 2012/0054198 A1 * | 3/2012 | Liang ................ | G06F 17/30952 707/747 |
| 2012/0150823 A1 * | 6/2012 | Tofano .............. | G06F 17/30336 707/692 |
| 2013/0159261 A1 * | 6/2013 | Dewey .............. | G06F 17/30156 707/692 |
| 2013/0287207 A1 * | 10/2013 | Zaverucha ........... | H04L 9/3236 380/44 |
| 2013/0339314 A1 * | 12/2013 | Carpentier ............ | G06F 3/0641 707/692 |
| 2014/0093073 A1 * | 4/2014 | Horgan ................ | H04L 9/0861 380/44 |
| 2015/0066872 A1 * | 3/2015 | Mendez Lojo ........... | G06T 1/20 707/692 |

* cited by examiner

*Primary Examiner* — Thu-Nguyet Le
*Assistant Examiner* — Nargis Sultana
(74) *Attorney, Agent, or Firm* — Volpe and Koenig, P.C.

(57) ABSTRACT

Methods and systems for identifying unique values in an input list are provided. A method in a processor is provided. The method includes generating a hash value list based on an input list of items using a respective work item of the processor for each item in the input list and identifying unique items in the input list based at least on the hash value list.

8 Claims, 3 Drawing Sheets

EFFICIENT DUPLICATE ELIMINATION

BACKGROUND

1. Field

Embodiments described herein generally relate to methods and apparatuses lot processing input lists of data.

2. Background Art

Duplicate elimination processes receive an input list of items and identify unique items in the list. Examples of a duplicate elimination processes include template functions included in the C++ Standard Template Library (STL). These functions can, for example, interchange each item in the input list that is a duplicate of a preceding item with the next, item that is not a duplicate. Thus, the duplicates remain in the list, but are shifted to the end of the list.

Although these functions eliminate duplicates, they often do not have broad applicability. For example, they may be inoperable in accelerated processing units (APU) that are based around a highly parallel set of processing units, such as graphics processing units (CPUs). Other functions can be used to eliminate duplicates in highly parallel APUs. These functions, however, often require large number of comparisons between, items of the input list, and thus can be highly resource intensive.

BRIEF SUMMARY OF EMBODIMENTS

In embodiments described here, methods and systems for identifying unique values in an input list are provided. For example, methods and systems described herein can use hash values to compare items in an input list instead of comparing the items themselves. In an embodiment, a method in processor is provided. The method includes generating a hash value list based on an input list of items using a respective work item of the processor for each item in the input list and identifying unique items in the input list based at least on the hash value list.

In another embodiment, a computer readable medium carrying one or more sequences of one or more instructions for execution by one or more processors to perform a method, the instructions when executed by the one or more processors, cause the one or more processors to: generate a hash value list based on an input list of items using a respective work item of the one or more processors for each item in the input list and identify unique items in the input list based at least on the hash value list.

These and other advantages and features will become readily apparent in view of the following detailed description of the invention. Note that the Summary and Abstract sections may set forth one or more, but not all example embodiments of the disclosed subject matter as contemplated by the inventor(s).

BRIEF DESCRIPTION OF THE DRAWINGS/FIGURES

The accompanying drawings, which are incorporated herein and form a part of the specification, illustrate the disclosed subject matter and, together with the description, further serve to explain the principles of the contemplated embodiments and to enable a person skilled in the pertinent art to make and use the contemplated embodiments.

Figure 1:
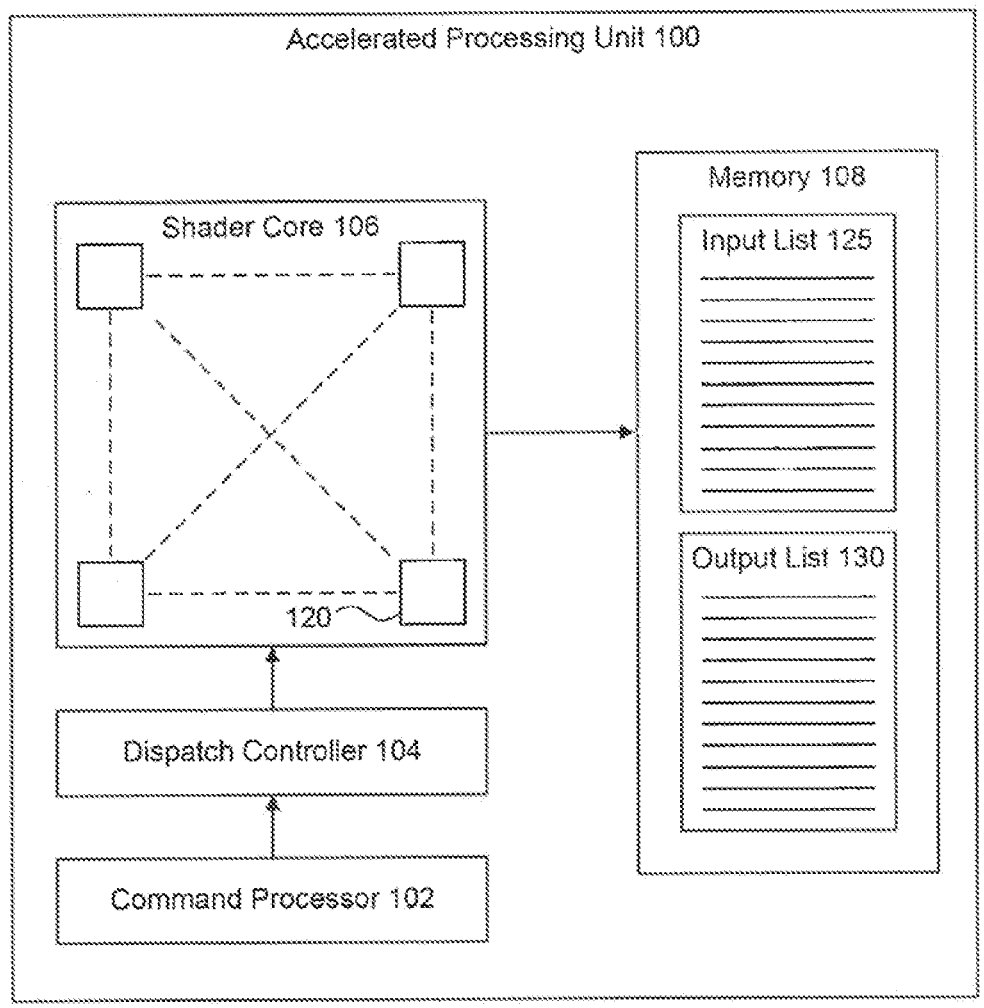
FIG. 1 is a block diagram illustration of an accelerated processing unit, according to some embodiments.

The disclosed subject matter will now be described with reference to the accompanying drawings. In the drawings, like reference numbers indicate identical or functionally similar elements. Additionally, tire left-most digit(s) of a reference number identifies the drawing in which the reference number first appears.

DETAILED DESCRIPTION

Duplicate elimination in a given list of objects is a basic building block for a number of different computing processes. A duplicate elimination process can, for example, receive a list of items and output another list that contains every element of the input list just once. In other words, the duplication elimination process can output a list of items in which each of the items is unique and every unique item in the input list is present in the output list. For example, in graphics processing, a duplicate elimination process can be used to eliminate duplicate items in a received list of primitives. The primitives can be provided as an input list of strings.

One example of a duplicate elimination process is the standard unique (std::unique) template function included in the C++ Standard Template Library (STL). The standard unique function receives a list of elements. The elements can include, for example, integers, characters, strings, and/or other types of data structures. The standard unique function interchanges each item in the input list that is a duplicate of a preceding item with the next item that is not a duplicate. Thus, the duplicates remain in the list, but are shifted to the end of the list. For example, for the following input list: $\{(1, 2), (3), (3), (1, 2)\}$, the standard unique function outputs the following list: $\{(1, 2), (3), (1, 2), (3)\}$.

Although the standard unique function delivers adequate performance in eliminating duplicates, this function does not have broad applicability. For example, the standard unique function may be inoperable in processing architectures that are designed around scalability. For example, the standard unique function may be inoperable in accelerated processing units (APU) that are based around a highly parallel set of processing units, such as graphics processing units (GPUs).

Other functions can, however, be used to eliminate duplicates in highly parallel architectures. For example, the Thrust library of functions provides a number of GPU-operable functions that correspond to the C++ STL functions. In one implementation, duplicates can be removed by first using the Thrust implementation of a standard sort function (thrust::sort). Once the input list of items is sorted, the Thrust implementation of the standard unique function (thrust::unique) can be used to eliminate the duplicates in the sorted list (e.g., by placing the duplicates at the end of the list).

This approach, however, has a number of drawbacks. For example, when the input list of items includes items that are more complicated than simple integers, the sort function may run into difficulties. For example, when the input list of items includes both integers and strings of integers, the sorting algorithm may not produce desired results, if an input list of items includes an integer (e.g., (2)) and a string (e.g., (1, 3)), the sort function may not be able to sort these two items. Because the unique function relies on a presorted list, the failure of the sort function may further cause the unique function to fail.

To address the complexity of comparing items of different types, the user can provide a custom sorting function to accomplish the sort. Even still, the approach of first applying a sort and then finding unique items cm be resource intensive.

In particular, the large number of comparisons between different items in the input requires a great deal of computing resources.

In embodiments described herein, a method for identifying unique items in an input list is provided. For example, in an embodiment, a hash value list can be generated based on the input list using a respective work item generated by a processing device. Using these hash values, unique items in the input list can be identified. For example, this method can be used to eliminate duplicate items in an input list by identifying those items that are unique.

In an embodiment, the hash value list is generated by computing a hash function for each item in an input list. The input list can include a number of different types of items. For example, the input list of items can include numbers, floating point values, integers, characters, enumerated types, strings of the preceding types, and/or other types of values known to those skilled in the relevant art. In another embodiment, each item can include different types of elements (also termed "fields").

As would be appreciated by those skilled in the relevant art based on die description herein, a hash function is a function that maps data or an item of a variable length and/or variable type to data of a single type and fixed length. As will be explained below in greater detail, a number of different hash functions exist. In an embodiment, the selection of one hash function over another depends on the hash function's ability to minimize "collisions." Collisions are identical hash values for different input data. As described in greater detail below, because collisions can necessitate comparisons between items of an input list, as opposed to a comparison of their respective hash values, decreasing the rate of collisions can enhance performance.

In an embodiment, the hash values can be compared to determine whether an Item is unique. For example, if the hash values of two items are different, the items can be determined to be different. However, if the hash values are identical, the items themselves can be compared (because of the possibility of a collision). For example, a user-defined equality operator can be used to compare items for which the hash value is the same. The equality operator can depend on, e.g., the type(s) of items in the input list.

In an embodiment, the method of identifying unique items in an input list can be implemented using an accelerated processing unit (APU). For example, the method of identifying unique items in an input list can be implemented using a graphics processing unit (GPU). FIG. 1 shows a simplified block diagram of an accelerated processing unit (APU) 100, according to an embodiment. In an embodiment, APU 100 is a GPU. As shown in FIG. 1, APU 100 includes a command processor 102, a dispatch controller 104, a shader core 106, and a memory 108. As shown in FIG. 1, memory 108 holds an input list 125 and an output list 130.

Shader core 106 includes processing units 120. In an embodiment, processing units 120 are single-instruction, multiple data (SIMD) processing units. In such, an embodiment, two or more of processing units 120 execute the same instruction on different sets of data. In a further embodiment, work items, or "threads," can be dispatched by dispatch controller 104 to execute on respective ones of processing units 120. In an embodiment, each of these work items executes the same instructions on different data. For example, each of these work items may compute a hash function on a respective item in input list 125 and may write its respective item to output list 130. The operation of APU 100 will be described with reference to FIGS. 2 and 3 below.

Figure 2:
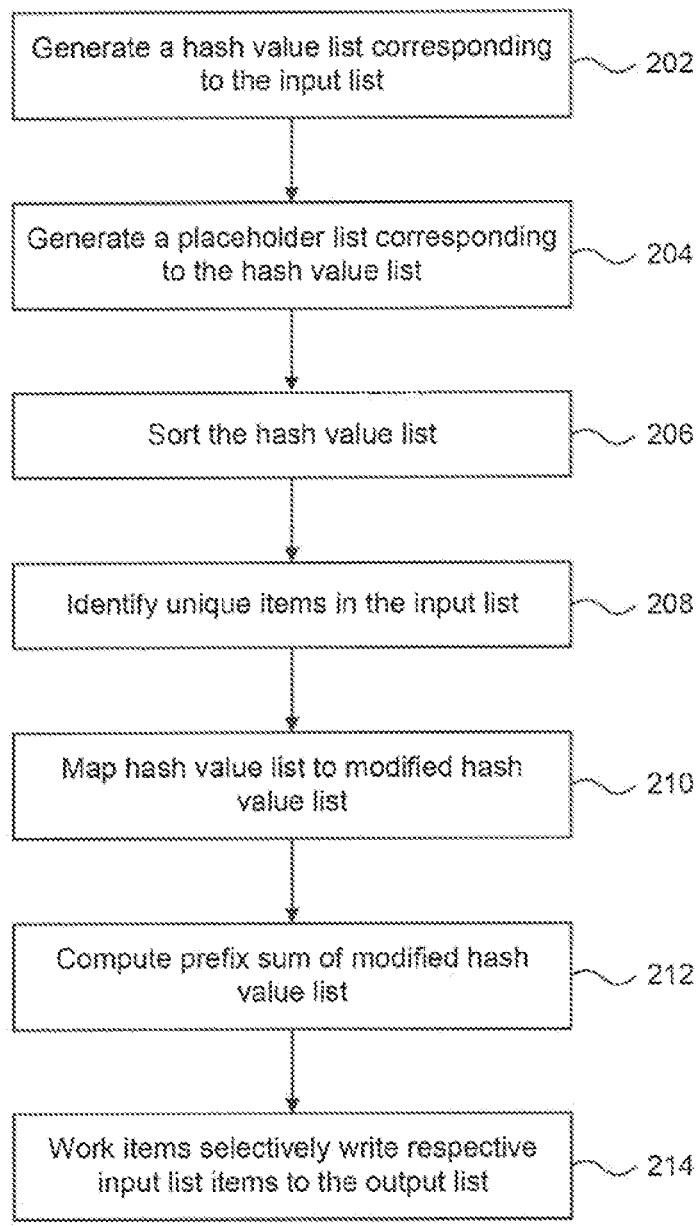
FIGS. 2 and 3 are flowcharts of methods of identifying unique items in an input list, according to some embodiments.

FIG. 2 shows a flowchart 200 of a method of identifying unique items in an input list of items, according to an embodiment Method 200 may not include all the steps shown or operate in the order shown. The steps of FIG. 2 are described in detail below.

To illustrate the operation of method 200, the steps of method 200 will be described with reference to the following input list L: $\{(1, 2), (3), (2), (1, 2)\}$. As would be appreciated by those skilled in the art based on the disclosure herein, the embodiment of FIG. 2 is not limited to this example. For example, the steps of flowchart 200 may also be applied to lists that include other types of items (e.g., characters, strings, and/or enumerated types).

In step 202, a hash value list is generated corresponding to the input list. For example, for input list L, a hash value can be generated for each item in the list. For example, one exemplary hash function is a maximum (max) function. The max function maps an input string of integers to the maximum value in the string. Thus, for input list L, the output hash value list H is $\{2, 3, 2, 2\}$.

In an embodiment, each hash value can be generated by a respective work item generated by an APU. For example, in executing a program, e.g., on a central processing unit (CPU), a kernel can be launched on an APU. For example, a kernel can be launched on APU 100 in FIG. 1. In launching the kernel, the program can specify the number of work items that will be generated on APU 100 for the kernel. For example, in the embodiment in which the APU kernel is used to eliminate duplicates and/or identify unique items in an input list, the program can specify that the number of work items generated to be at least equal to the number of items in the input list of items. After the kernel is launched on APU 100, command processor 102 will generate the commands that will be executed by each work item based on the kernel. Dispatch controller 104 will generate each work item. In an embodiment, each work item executes on a respective processing element of processing elements 120 of shader core 106 (e.g., in parallel). In a further embodiment, each of the work items executes the same commands on different data. For example, each of the work items can execute the same commands using its respective item in the input list as the starting point. In a further embodiment, the Thrust implementation of the for_each function (thrust::for_each) can be used to specify the hash function executed by each work item.

Depending on the complexity of the hash function, each of the work items may include one or more instructions needed to compute its respective hash value. For example, in the embodiment in which a max function is used as the hash function, each work item may include instruction(s) needed to compare each element of an item to other elements of the item.

Those skilled in the relevant arts based on the description herein will recognize that the max function provided here as a hash function is one example of a bash function. Other hash functions can be used. For example, the following hash function, $h(x)$, can be used to map an element, e, to an integer hash value (termed result):

--- initially set the variable result to a value greater than 0;
if e is a Boolean value, compute $c = (e\ ?\ 1 : 0)$;
if e is of type byte, char, short, or int, compute $c = (int)\ e$;
if e is of type long, compute $c = (int)\ (e \hat{}\ (e >>> 32))$;
if e is of type float, compute $c = sin(e)$;
if e is of type double, compute $c = (int)\ (cos(e)\hat{}(cos(e) >>> 32))$;
if e is an object reference and the class's equality operator (i.e., the == method) compares the field by recursively invoking equals, -continued recursively invoke hashCode on the field, if e is null, return 0; and
return the result, where result = 31 * result + c.

In an embodiment, a hash function can be chosen based on its ability to minimize collisions. That is, a hash function can be chosen based on the likelihood that two or more different input items will be mapped to the same hash value. As will be described in greater detail below, reducing collisions can be important for the efficiency of determining unique items. For example, reducing collisions can reduce the number of times the items themselves are compared (as opposed to comparing their respective hash values).

In step 204, a placeholder list is generated corresponding to the hash value list. The placeholder list can be used to associate values in the hash value list to their respective items in the input list. In the above example, for hash value list H, the placeholder list I would be $\{0, 1, 2, 3\}$. That is, the $0^{th}$ value in the hash value list H corresponds to the $0^{th}$ value in the input list L, the $1^{st}$ value in the hash value list H corresponds to the $1^{st}$ value in the input list L, and so on. In the example of FIG. 1, each value in the placeholder can be generated by the respective work item and can be stored in memory 108. In an embodiment, the placeholder list I can be generated using the Thrust implementation of the sequence function (thrust::sequence).

In step 206, the hash value list is sorted. For example, in the example above, the hash value list would be sorted from least to greatest and the output would be H=$\{2, 2, 2, 3\}$. In a further embodiment, the placeholder list is reordered along with the hash value list so as to maintain the correspondence between the hash values and their respective item in the input list. Thus, the placeholder list would be sorted as I=$\{0, 2, 3, 1\}$. That is, the $0^{th}$ value in the hash value list H corresponds to the $0^{th}$ value in the input list L, the $1^{st}$ value in the hash value list H corresponds to the $2^{nd}$ value in the input list L, and so on. In an embodiment, the hash values can be sorted using an implementation of the radix sort algorithm. In another embodiment, the hash values and the corresponding placeholder values can be sorted using the Thrust implementation of the sort_by_key function (thrust::sort_by_key).

In step 208, unique items in the input list are identified.

Figure 3:
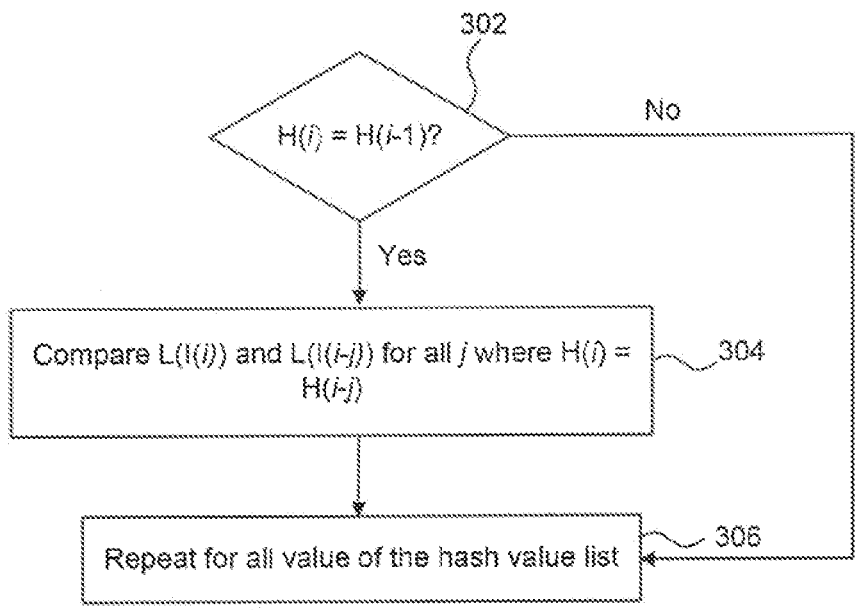

FIG. 3 provides a flowchart of a method 300 for identifying unique items that can be used for step 208. In step 302, it is determined whether the $i^{th}$ value in the hash value list is equal to the immediately preceding value in the hash value list. In other words, each value is compared to the value immediately preceding it in the hash value list. If they are not equal, method 300 proceeds to step 306 and the steps of method 300 are repeated for all other values in the hash value list.

If the $i^{th}$ value is equal to the value immediately preceding it, step 304 is reached. In step 304, an equality operator is used to compare L(i) and L(i−j) for all j where H(i)=H(i−j). That is, the equality operator compares the item in the input list corresponding to the $i^{th}$ hash value to all items in the input list corresponding to preceding values of the hash value list equal to the $i^{th}$ hash value. Thus, the equality operator is only used when the corresponding hash values are the same. The equality operator can be defined by the user based on the type(s) of items included in the input list.

In the above example with sorted hash value list H=$\{2, 2, 2, 3\}$, the results of the comparisons in step 302 would be F, T, T, and F for the first, second, third, and fourth comparisons, respectively. Using the placeholder list I=$\{0, 2, 3, 1\}$ to identify items in input list L that correspond to the values in hash value list H, item comparisons would occur between the $2^{nd}$ and $0^{th}$ items, between the $3^{rd}$ and $2^{nd}$, and between the $3^{rd}$ and the $0^{th}$ items in the Input list resulting in F, F, and T. The first and second comparisons are thus the result of collisions in the hash function (i.e., the max function). The third comparison, however, shows that the $3^{rd}$ and $0^{th}$ items in the input list are duplicates.

Returning to FIG. 2, in step 210 the hash value list is mapped to a modified hash value list. In an embodiment, the modified hash value list indicates which items in the input list are unique. In the above example of FIG. 3, after comparing the hash values, $3^{rd}$ and $0^{th}$ items in the input list are duplicates. The second and third items, on the other hand, are unique. To capture this in a modified hash value list, the modified hash value list can include a first value (e.g., 0) for hash values corresponding to items that are not unique and a second value (e.g., 1) corresponding to values that are unique. In the example described above, the modified hash value list M=$\{0, 1, 0, 1\}$.

In step 212, a prefix sum of the modified hash value list, is computed. A prefix sum for a value in the hash value list is equal to the sum of the value and all values preceding it. Thus, in the example described above, the prefix sum of the modified hash value list M would be S=$\{0, 1, 1, 2\}$.

In step 214, work items selectively write respective input items to the output list. For example, as noted above, the prefix sum in the above example is S=$\{0, 1, 1, 2\}$. In an embodiment the prefix sum can be used to determine which work items write their output to the output list of item. In particular, if a value in the prefix sum list S is different from the one immediately preceding it, corresponding work, item will write its respective input item to the output list. (The correspondence between list S and list L is established using list I, as noted above.) Thus, in the example described above, work items 0, 2 and 1 write their respective hash values input items to the output list. Therefore, the output list O=$\{(1,2), (2), (3)\}$.

Implementations of methods 200 and 300 may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC, SystemC Register Transfer Level (RTL), and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present disclosure should not be limited by any of the above-described exemplary embodiments, but should be defined only in accordance with the following claims and their equivalence.

It is also to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method in a processor, comprising:
   generating a hash value list based on an input list of items using a respective work item of a plurality of work items of the processor for each item in the input list;
   identifying unique items in the input list based at least on the hash value list;
   mapping the hash value list to a modified hash value list based on the identified unique items by outputting a first value for each unique item in the input list and a second value for all other items in the input list;
   computing a prefix sum list by replacing each of the first and second values in the modified hash value list with a sum of each of the first and second values in the modified hash value list and each value preceding it in the modified hash value list; and
   writing a respective item from the input list of items to an output list of items by a work item of the plurality of work items in response to a corresponding value in the prefix sum list being different from an immediately preceding value in the prefix sum list.

2. The method of claim 1, wherein the generating the hash value list comprises:
   computing a hash value using a hash function for each item in the input list of items.

3. The method of claim 1, wherein the identifying comprises:
   determining whether any value is present more than once in the hash value list.

4. The method of claim 3, wherein the identifying further comprises:
   comparing items in the input list of items that have a same corresponding value in the hash value list.

5. A non-transitory computer readable medium storing instructions for execution by one or more processors to perform a method, the instructions when executed by the one or more processors, cause the one or more processors to:
   generate a hash value list based on an input list of items using a respective work item of a plurality of work items of the one or more processors for each item in the input list;
   identify unique items in the input list based at least on the hash value list;
   map the hash value list to a modified hash value list based on the identified unique items by outputting a first value for each unique item in the input list and a second value for all other items in the input list;
   compute a prefix sum list by replacing each of the first and second values in the modified hash value list with a sum of each of the first and second values in the modified hash value list and each value preceding it in the modified hash value list; and
   writing a respective item from the input list of items to an output list of items by a work item of the plurality of work items in response to a corresponding value in the prefix sum list being different from an immediately preceding value in the prefix sum list.

6. The computer readable medium of claim 5, wherein the generating the has value list comprises:
   computing a hash value using a hash function for each item in the input list of items.

7. The computer readable medium of claim 5, wherein identifying comprises:
   determining whether any value is present more than once in the hash value list.

8. The computer readable medium of claim 7, wherein the identifying further comprises:
   comparing items in the input list of items that have a same corresponding value in the hash value list.

* * * * *